United States Patent [19]

Huiner

[11] 4,361,070
[45] Nov. 30, 1982

[54] METHOD AND APPARATUS FOR MUSIC INSTRUCTION ON A BARRED OR KEYBOARD INSTRUMENT

[76] Inventor: Tona L. Huiner, 530 Lafayette Ave., Buffalo, N.Y. 14222

[21] Appl. No.: 270,502

[22] Filed: Jun. 4, 1981

[51] Int. Cl.³ .............................................. G09B 15/02
[52] U.S. Cl. ........................................ 84/478; 84/480; 84/483 R
[58] Field of Search ............. 84/470 R, 471 R, 477 R, 84/478, 479 R, 480-483; 283/47

[56] References Cited

U.S. PATENT DOCUMENTS

| 1,758,043 | 5/1930 | Hoffmeister | 84/483 |
| 2,718,169 | 9/1955 | Barnes | 84/480 |
| 3,577,890 | 5/1971 | Walker et al. | 84/472 |

FOREIGN PATENT DOCUMENTS

| 247016 | 2/1926 | United Kingdom | 283/47 |
| 2028564 | 3/1980 | United Kingdom | 84/471 R |

*Primary Examiner*—Lawrence R. Franklin
*Attorney, Agent, or Firm*—Christel, Bean & Linihan

[57] ABSTRACT

A method and apparatus for teaching the relationship between the conventional musical staff and the tone-producing elements or keys of a barred or keyboard type instrument. The apparatus includes an elongated base member having a planar surface on which a replica of a portion of a conventional musical staff consisting of at least five parallel lines is depicted. Each line positioned on the base member is separated from the next line by a distance essentially equal to the width of two tone-producing elements on the instrument. A plurality of cover strips fabricated out of releasable material having a width equal to the width of a single key are superimposed over the lines on the base member in overlying relationship to the lines to provide alternating and parallel covered and uncovered areas of substantially equal width. In utilizing the method according to this invention, the apparatus is initially positioned parallel to the horizontal axis of the keyboard such that each covered and uncovered area corresponds to a particular key on the keyboard. Later, the apparatus is rotated to a second position which is perpendicular to the horizontal axis of the keyboard to represent a conventional musical staff wherein each line (covered area) and space (uncovered area) is visually represented in a one-to-one relationship with each corresponding tone-producing element of the instrument.

7 Claims, 6 Drawing Figures a  
WHITE KEYS b  
COVER STRIPS IN-PLACE c  
COVER STRIPS REMOVED TO UNCOVER NEW STAFF d  
SPACIAL RELATION OF NEW STAFF TO CONVENTIONAL STAFF a WHITE KEYS
b COVER STRIPS IN-PLACE
c COVER STRIPS REMOVED TO UNCOVER NEW STAFF
d SPACIAL RELATION OF NEW STAFF TO CONVENTIONAL STAFF

MIDDLE C

METHOD AND APPARATUS FOR MUSIC INSTRUCTION ON A BARRED OR KEYBOARD INSTRUMENT

BACKGROUND OF THE INVENTION

This invention relates to a method and apparatus for instructing students to play keyboard or barred instruments such as the piano, glockenspiel and many other well known instruments of this type. More particularly, this invention relates to a method and apparatus to be used by music instructors to demonstrate to their students the relationship between musical notes positioned in a particular pattern or arrangement upon a conventional musical staff, and the particular tone-producing elements or keys on the instrument responsible for producing the corresponding sound patterns.

Most present methods used by music teachers to instruct students on keyboard instruments such as the piano, involve teaching the student to associate a note positioned on either a line or space of a conventional treble or bass staff, with the correct key on the instrument keyboard. The student is taught that each line and space of the staff may be represented by a letter of the alphabet, A-G, and that each key along the keyboard may also be designated with the letters A-G. Through memorization techniques the student is eventually able to locate a particular key on the keyboard which corresponds to a note positioned on a particular line or space of the conventional staff. This method of instruction although effective, forces the student, at least initially, to rely on a "hunt-and-peck" method to locate a particular key. This slows the learning process and fails to instill in the student any immediate visual recognition of the relationship between the staff and the keyboard.

The method and apparatus of the present invention are intended to replace the conventional "hunt-and-peck" system. Although based on the conventional musical staff, the purpose of this invention is to immediately relay to the student visually, the relationship between patterns of notes arranged on a conventional staff or sheet of music and the particular keys on the instrument which correspond to each line or space on the staff. By using this method the student is able to understand music more quickly without having to stop and locate each note individually.

SUMMARY OF THE INVENTION

It is therefore an object of this invention to provide a new method for instructing a student to play a musical instrument of the keyboard type which method is easy to learn and simple to demonstrate.

It is the further object of this invention to provide a teaching device for teaching a student to play a musical instrument of the keyboard type which is simple in design and economical to manufacture.

It is a further object of this invention to provide an apparatus or teaching device for use as an aid in teaching a student to play a musical instrument which apparatus is lightweight and portable and which may be positioned parallel to the horizontal axis of the keyboard to represent the actual spacial relationship of the keys on the keyboard, and which may be easily rotated to a second position which is perpendicular to the horizontal axis of the keyboard to represent at least a portion of a conventional musical staff consisting of five lines and four spaces wherein each line and space is visually represented in a one-to-one spacial relationship to each corresponding key on the keyboard.

It is a further object of this invention to provide a method and apparatus to be used in teaching a student to play a musical instrument which clearly demonstrates the direction of sound and pitch and the relationship of sound and pitch to the keyboard and staff.

The present invention provides an apparatus comprising an elongated base member having a planar surface on which a replica of at least a portion of a conventional musical staff consisting of at least five parallel lines and four spaces is depicted. Each line positioned on the base member is separated from the next line by a distance essentially equal to the width of two tone producing elements or keys of the instrument. A plurality of cover strips fabricated out of releasable material having a width equal to the width of a single tone producing element on the keyboard, are superimposed over the lines on the base member such that each cover strip is transected longitudinally equally by the line beneath to provide alternating and parallel covered and uncovered areas of substantially equal width. In this manner a new pictorial representation of the staff is created whereby the width of each line (covered area) and space (uncovered area) on the new staff corresponds to the width of a single key or bar on the instrument. This one-to-one special relationship is critical to the method of the instant invention in that it visually allows the student to see the relationship between the keys on the instrument and the lines and spaces on the staff.

This apparatus provides a further advantage when used to teach students of the piano, because it clearly demonstrates that only the white keys correspond to the lines and spaces of the staff. Thus any confusion as to the significance of the black keys by the beginning student is clearly avoided.

The foregoing and additional advantages and characterizing features of the present invention will become clearly apparent upon a reading of the ensuing detailed description together with the included drawings wherein:

DESCRIPTION OF THE PREFERRED EMBODIMENTS

Figure 1:
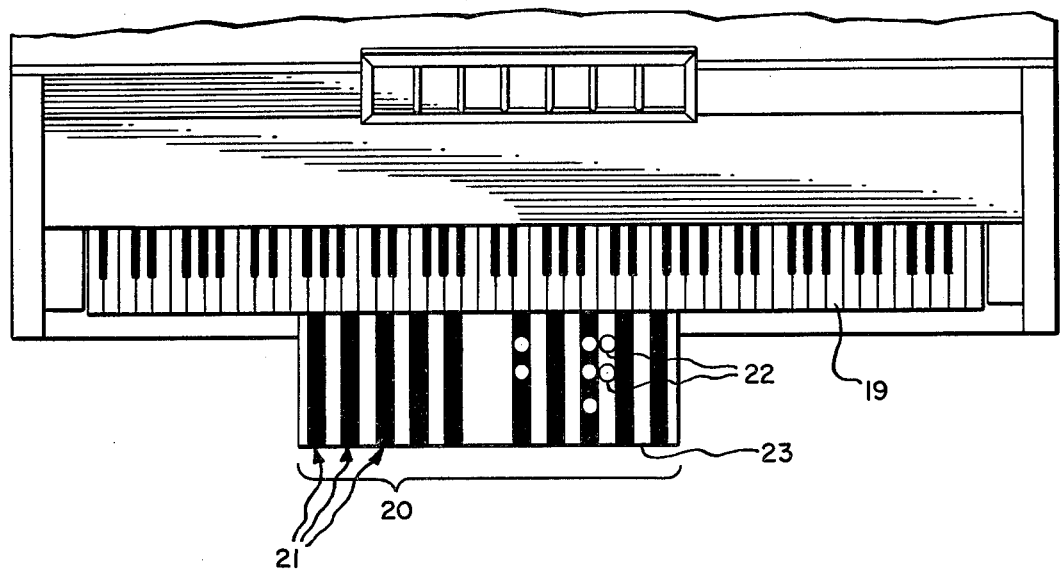
FIG. 1 is a fragmentary plan view of the keyboard of a conventional piano showing the apparatus according to this invention in actual use positioned along the horizontal axis of the keyboard.

In FIG. 1 the teaching device according to the present invention is generally designated 20, and is shown positioned along the horizontal axis of a piano keyboard 19. In actual use cover strips 21 and display elements 22 are removably attached to base member 23.

Figure 3:
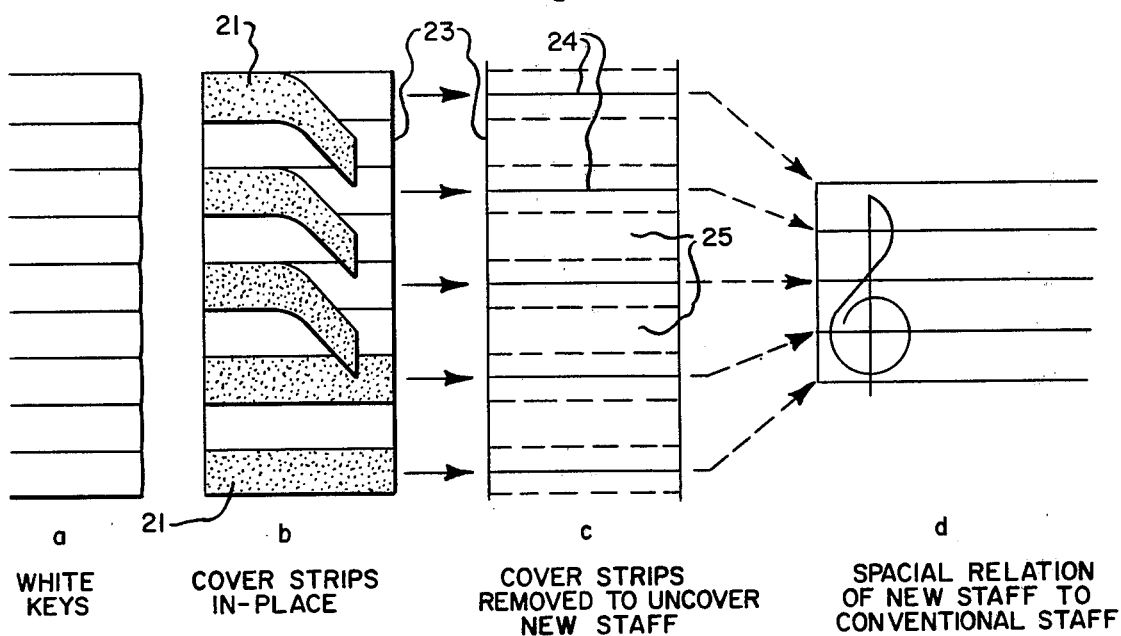
FIG. 3 shows the apparatus according to this invention used with a piano illustrating the one-to-one dimensional relationship between the width of the white keys (3a) and the width of the lines and spaces of the apparatus when the cover strips are attached (3b) and further demonstrating the dimensional relationship between the lines and spaces appearing on the base member when the cover strips are removed (3c) and the correspondence between the lines and spaces of the base member and the lines and spaces of a conventional musical staff (3d).
Figure 4:
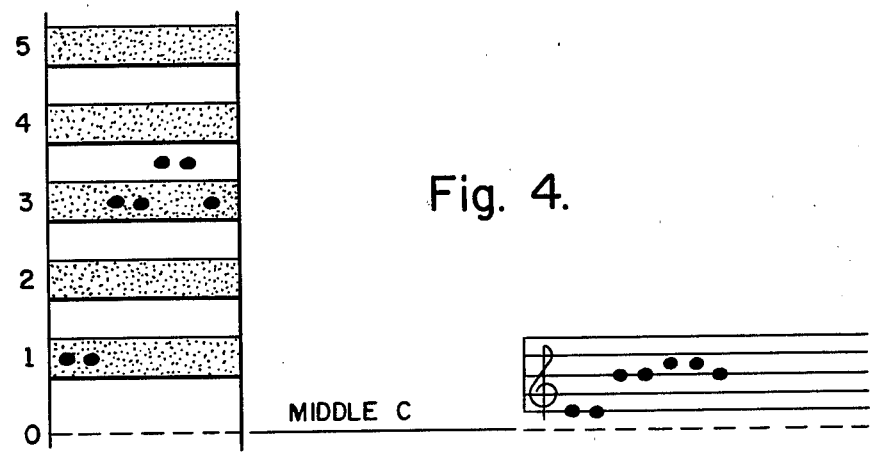
FIG. 4 is a view of the apparatus according to this invention having a group of removably mounted display elements representing traditional musical symbols arranged on the apparatus in a particular pattern, and further showing the corresponding arrangement as it would appear on a conventional musical staff.

The presesnt invention provides an apparatus comprising an elongated base member 23 having a planar surface and including a plurality of spaced, parallel lines extending transversely of the longitudinal axis of the base member. Each line is spaced from the next adjacent line by a distance substantially corresponding to the width of two tone-producing elements of the instrument which are normally contacted by the user and with which the apparatus is intended to be used. When the device is used to teach piano, the width of two adjacent white keys will be used to determine the spacing for each line on the base member (FIGS. 3 a–c). A plurality of cover strips 21 fabricated out of releasable material each having a width substantially equal to the width of a single tone-producing element of the keyboard are superimposed over the planar surface of the base member in overlying relationship to the lines to provide alternating and parallel covered and uncovered areas of substantially equal width. It is preferred that each cover strip be represented by a contrasting color such that the covered and uncovered areas are clearly distinguishable. In this manner a new pictorial representation of the staff is created wherein the width of each line (covered area) and each space (uncovered are) corresponds to the width of each key or bar on the instrument illustrating visually the one-to-one relationship between the keys and the staff.

Figure 2:
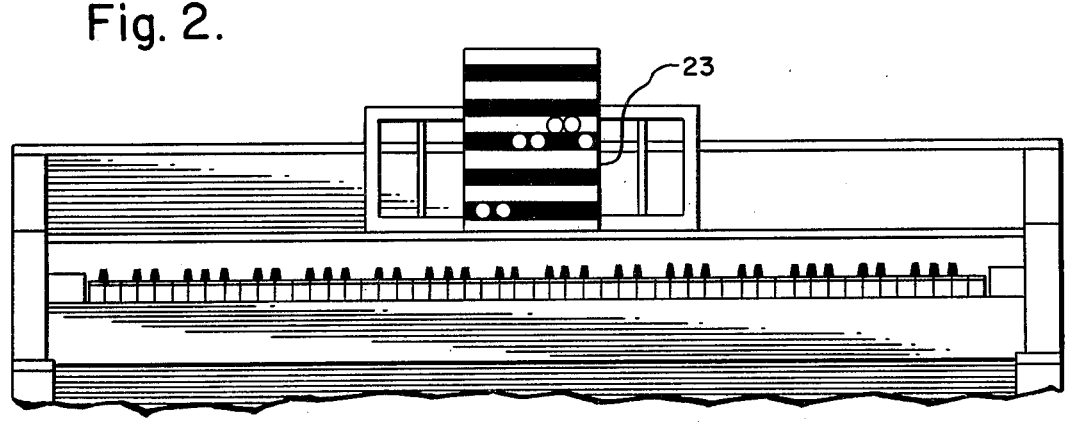
FIG. 2 is a fragmentary front view of a conventional piano showing the apparatus according to this invention positioned on the music rack of the piano.

Generally, during actual use, only the treble portion of the staff (i.e. a single staff) consisting of five (5) lines and four (4) spaces is utilized, but the apparatus of this invention may be enlarged to include any number of lines and spaces and may be easily used to demonstrate both the treble and bass staff (i.e. double staff). For illustration purposes, FIG. 1 shows an embodiment consisting of a double staff, and FIG. 2 illustrates a single staff device. The double staff, of course, may be easily cut or folded into any desired length.

In addition this apparatus may be used with other musical tonal systems or modes having a note range C'-G" when the appropriate musical notational symbols are used in conjunction with the device.

The cover strips may be releasably attached to the base member by any appropriate means such as magnetic attraction, VELCRO fastening, flannel board, releasable tape, push pins, thumb tacks or by any method equivalent to those enumerated above. In addition, various traditional musical notation symbols may be fabricated out of the same or similar material as that used for the cover strips such that the musical symbols may be easily arranged in any desired pattern on the apparatus as desired. In this manner symbols designating notes, stems, flats, sharps, etc. may all be easily fastened to and removed from the underlying apparatus for demonstration purposes.

FIG. 3 (a and b) illustrates the critical spacial relationship required when the apparatus according to this invention is used to teach piano. On this instrument the width of each cover strip and the width of each space located between each cover strip must be essentially equal to the width of one white key.

Figure 5:
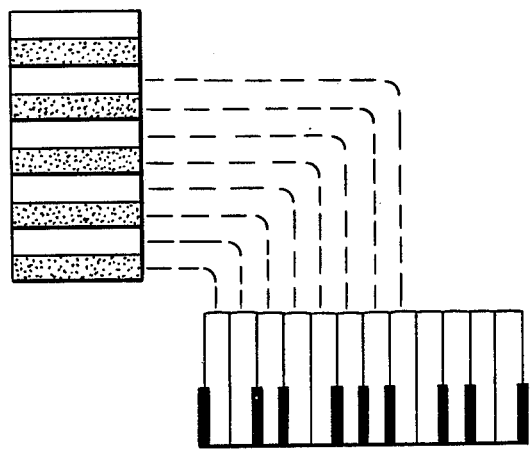
FIG. 5 is a view of a portion of a conventional piano keyboard showing the spacial relationship between the lines and spaces of the apparatus according to this invention and the white keys of the instrument.

As may readily be seen from FIG. 5, the apparatus of this invention transposes the white keys from the horizontal plane to the vertical plane by expanding the vertical axis of the conventional musical staff such that each line and space correlates visually and physically to each white key in a one-to-one relationship. This relationshipis immediately visible to the pupil thereby eliminating much of the confusion associated with conventional musical notation.

In utilizing the method according to this invention, base member 23 with cover strips attached is initially placed in a horizontal position either immediately above or below the keyboard of a particular instrument. For illustration purposes the piano will be discussed herein.

When the student is initially introduced to the piano keyboard, the teacher positions a single staff version of the apparatus along the horizontal axis as demonstrated in FIG. 1. Each alternating, parallel, covered and uncovered area along the device is lined up with each corresponding white key. The teacher or student arranges notes along the apparatus in a random manner and plays the corresponding keys on the piano. This exercise demonstrates immediately to the student the one-to-one correspondence existing between the apparatus and the keyboard.

The teacher may wish to designate each line (cover strip) by a suitable number or letter name giving the student a reference point for referring to the lines and for positioning the device along the keyboard in a consistent manner. However, such a designation procedure is optional and should be left to the discretion of each individual instructor.

The teacher then arranges groups of notes along the apparatus to demonstrate basic tonal patterns such as intervals. These patterns are arranged and played from opposite directions (i.e. right to left and left to right). In this manner the student learns to visually recognize the direct relationship between each pattern; the apparatus and the keyboard; the succession of notes and the direction of sound as notes are played to the right or left on the keyboard. Once the basic interval patterns are familiar to the student, the teacher rotates the apparatus 90°, positioning the device essentially perpendicular to the horizontal axis of the keyboard as shown in FIG. 2 such that the same portion of the apparatus which corresponds to Middle C on the piano keyboard when the device was used in the horizontal position now corresponds to Middle C on the staff when the apparatus is placed in the vertical position. In this position the one-to-one relation between the white keys and the musical staff becomes readily apparent to the student. It also becomes apparent that movement to the right along the keyboard represents upward movement on the staff (i.e., upward movement on the apparatus or staff corresponds to a higher pitch or movement to the right along the keyboard).

Once the student is familiar with the apparatus in the vertical position, the teacher then removes the cover strips to expose the conventional staff lines below. The student is then shown that all of the basic patterns demonstrated on the device when the cover strips were in place and the relationship between these patterns, the keyboard and the staff still exist.

The apparatus according to this invention is manufactured to be lightweight, portable, economical to produce and easily rotated from the horizontal to the vertical plane. Several methods of manufacture are available, but preferably the most economical method will be utilized.

The preferred apparatus is fabicated out of a magnetized, rubberized material which permits easy attachment and release of both the cover strips and the musical notation symbols which are also magnetized. Various other constructions may be utilized as, for example, the base member may be made out of metal, aluminum, heavy paper, cardboard or plastic utilizing releasable adhesive tape or plastic material as the cover strips.

Figure 6:
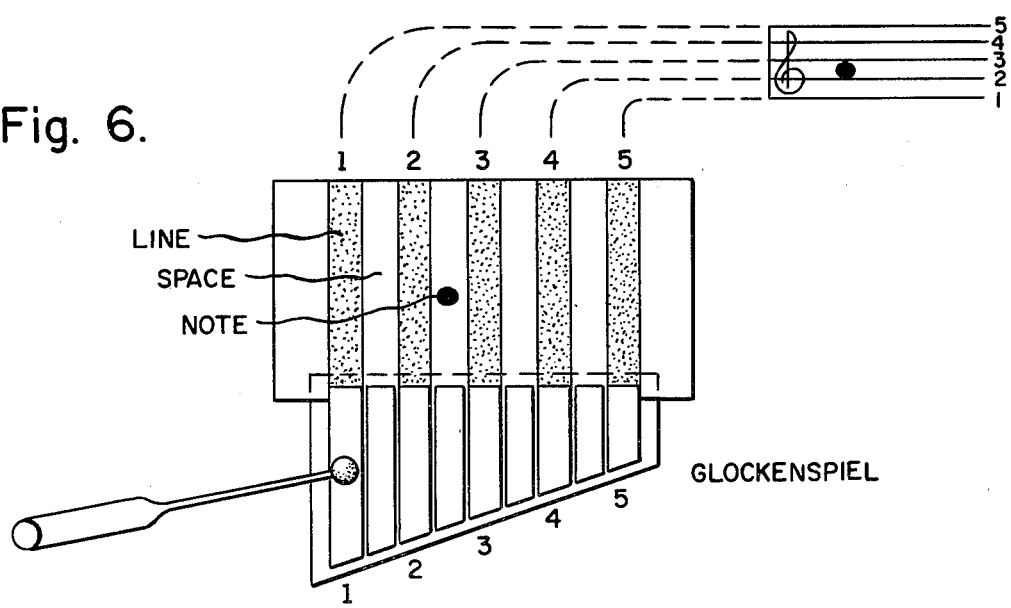
FIG. 6 shows the apparatus according to this invention in actual use along the horizontal axis of a glockenspiel.

There are many different types of barred and keyboard instruments suitable for use with the apparatus according to this invention. FIG. 6 demonstrates the embodiment suitable for use with a glockenspiel. In this embodiment the widths of the cover strips and spaces therebetween have been changed to correspond exactly to the width of the individual bars located on the glockenspiel. Dimensional variations in the apparatus will be required depending on the width of the keys or bars on a particular instrument. However, certain instruments such as the organ, piano, harpsichord, etc. utilize standard size keyboards so that in most cases one embodiment of the apparatus may be used to teach music or several instruments.

From the foregoing, it is apparent that the objects of the present invention have been fully accomplished. As a result of this invention a musical teaching apparatus and method for using this apparatus have been provided which visually demonstrate the relationship between the lines and spaces of a conventional musical staff and the keys on the instrument in a one-to-one spacial relationship. Furthermore an apparatus has been provided which teaches the student the direction of sound on a keyboard instrument.

While the foregoing has set forth the preferred embodiment of the present invention, it is to be understood that all similar embodiments which would be obvious to those skilled in the art or which would be equivalent to those disclosed herein, are intended to be included within the scope of the claimed invention.

What is claimed is:

1. A teaching device for teaching the relationship between musical notes on a staff and the keyboard of a keyboard or a barred instrument, said device comprising:
    (a) an elongated base member having a planar surface and including a plurality of spaced, parallel lines on said planar surface extending transversely of the longitudinal axis of said base member, said lines depicting at least one musical staff, said lines being spaced a distance substantially corresponding to the width of two tone-producing elements of the instrument which are contacted by the user and with which the apparatus is intended to be used; and
    (b) a plurality of cover stirps adapted to be releasably attached to said base member having a width substantially corresponding to the width of a single tone-producing element of the instrument, said cover strips covering a portion of the planar surface of said base member in overlying relationship to said lines to provide alternating and parallel covered and uncovered areas of substantially equal width.

2. The teaching device according to claim 1 further comprising a plurality of display elements representing conventional musical symbols of suitable size and shape, adapted to be releasably attached to said base member and said cover strips.

3. The teaching device of claim 2 wherein said device is foldable about a transverse axis for ease of transport.

4. A method of teaching the relationship between musical notes on a staff and the keyboard of a keyboard or barred instrument, said method comprising the steps of:
    (a) providing a device comprising an elongated base member having a planar surface and including a plurality of spaced, parallel lines on said planar surface extending transversely of the longitudinal axis of said base member, said lines depicting at least one musical staff, said lines being spaced a distance substantially corresponding to the width of two tone-producing elements of the instrument which are contacted by the user and with which the apparatus is intended to be used; and a plurality of cover strips adapted to be releasably attached to said base member having a width substantially corresponding to the width of a single tone-producing element of the instrument, said cover strips covering a portion of the planar surface of said base member in overlying relationship to said lines to provide alternating and parallel covered and uncovered areas of substantially equal width;
    (b) positioning said device substantially adjacent and parallel to the horizontal axis of the keyboard;
    (c) releasably securing display elements representating conventional musical notes and symbols in a random pattern upon the device; and
    (d) playing each tone producing element on the keyboard of the instrument which corresponds to a particular random pattern of musical notes and symbols.

5. The method of claim 4 further comprising the steps of:
    (e) positioning said device substantially adjacent and parallel to the horizontal axis of the keyboard;
    (f) releasably securing said display elements upon the device in conventional patterns to illustrate basic musical interval patterns; and
    (g) playing each tone-producing element on the keyboard of the instrument which corresponds to a particular conventional pattern of musical notes and symbols.

6. The method of claim 5 further comprising the steps of:
    (h) positioning said device essentially perpendicular to the horizontal axis of the keyboard;
    (i) releasably securing said display elements upon the device in conventional patterns to illustrate basic musical interval patterns; and
    (j) playing each tone-producing element on the keyboard of the instrument which corresponds to a particular conventional pattern of musical notes and symbols.

7. The method of claim 6 further comprising the steps of:
    (k) removing said cover strips from said base member exposing the lines beneath;
    (l) releasably securing said display elements upon the device in conventional patterns to illustrate basic musical interval patterns; and
    (m) playing each tone-producing element on the keyboard of the instrument which corresponds to a particular conventional pattern of musical notes and symbols.

* * * * *